(12) United States Patent
Kim et al.

(10) Patent No.: US 10,344,917 B2
(45) Date of Patent: Jul. 9, 2019

(54) LPG FILLING SYSTEM OF BI-FUEL VEHICLE

(71) Applicant: Hyundai Motor Company, Seoul (KR)

(72) Inventors: Chang Han Kim, Gwangju (KR); Keun Soo Kim, Yongin-si (KR); Jong Ki Kim, Seongnam-si (KR); Jin Su Jeong, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 383 days.

(21) Appl. No.: 15/374,161

(22) Filed: Dec. 9, 2016

(65) Prior Publication Data
US 2018/0058632 A1    Mar. 1, 2018

(30) Foreign Application Priority Data

Aug. 31, 2016  (KR) .......................... 10-2016-0111590

(51) Int. Cl.
*B67D 7/78*    (2010.01)
*F17C 6/00*    (2006.01)
(Continued)

(52) U.S. Cl.
CPC ............. *F17C 6/00* (2013.01); *B67D 7/78* (2013.01); *F17C 5/007* (2013.01); *F17C 13/025* (2013.01); *B60K 2015/03144* (2013.01); *B60K 2015/03309* (2013.01); *B60K 2015/03414* (2013.01); *F17C 2221/033* (2013.01); *F17C 2221/035* (2013.01);
(Continued)

(58) Field of Classification Search
CPC .......... F17C 6/00; F17C 5/007; F17C 13/025; F17C 2227/0341; F17C 2221/035; F17C 2223/033; F17C 2223/0153; F17C 2270/0168; F17C 2227/0372; F17C 2265/065; F17C 2225/044; F17C 2270/0139; F17C 2221/033; F17C 2227/04; F17C 2270/0581; B67D 7/78; Y02T 10/32; Y02T 10/36; B60K 2015/03309; B60K 2015/03414; B60K 2015/03144

See application file for complete search history.

(56) References Cited

U.S. PATENT DOCUMENTS

2011/0114058  A1*  5/2011  Cohn ...................... F02B 43/00
                                                               123/25 A

FOREIGN PATENT DOCUMENTS

JP   2006-250149 A   9/2006
JP   2009-097355 A   5/2009
(Continued)

*Primary Examiner* — Jason K Niesz
(74) *Attorney, Agent, or Firm* — Morgan, Lewis & Bockius LLP (57) ABSTRACT

A liquefied petroleum gas (LPG) filling system of a bi-fuel vehicle is provided. The LPG filling system may be configured for reducing the temperature and pressure in an LPG bombe for storing LPG in the case in which the external temperature is very high, e.g. in the hot season, whereby it is possible to easily refill the LPG bombe with LPG. The LPG filling system is configured to cool the inside of an LPG bombe and to reduce the vapor pressure of LPG by supplying some gasoline from a gasoline tank into the LPG bombe using the fact that the temperature of gasoline in the gasoline tank is lower than the temperature of LPG in the LPG bombe, whereby it is possible to easily refill the LPG bombe with LPG even in the case in which the external temperature is very high, e.g. in the hot season.

12 Claims, 6 Drawing Sheets

(51) Int. Cl.
  *F17C 13/02* (2006.01)
  *F17C 5/00* (2006.01)
  *B60K 15/03* (2006.01)

(52) U.S. Cl.
  CPC .......... *F17C 2223/0153* (2013.01); *F17C 2223/033* (2013.01); *F17C 2225/044* (2013.01); *F17C 2227/0341* (2013.01); *F17C 2227/0372* (2013.01); *F17C 2227/04* (2013.01); *F17C 2265/065* (2013.01); *F17C 2270/0139* (2013.01); *F17C 2270/0168* (2013.01); *F17C 2270/0581* (2013.01); *Y02T 10/32* (2013.01); *Y02T 10/36* (2013.01)

(56) References Cited

FOREIGN PATENT DOCUMENTS

| KR | 2002-0020570 A | 3/2002 |
|----|----------------|--------|
| KR | 10-2013-0065025 A | 6/2013 |
| KR | 10-2013-0066011 A | 6/2013 |
| KR | 10-1291025 B1 | 7/2013 |
| KR | 10-2014-0052532 A | 5/2014 |

\* cited by examiner

FIG. 7 ly equipped with a gasoline supply system including a gasoline tank and a liquefied petroleum gas (LPG) a liquefied petroleum gas (LPG) supply system including an LPG bombe.

LPG FILLING SYSTEM OF BI-FUEL VEHICLE

CROSS-REFERENCE TO RELATED APPLICATION

The present application claims priority to Korean Patent Application No. 10-2016-0111590 filed on Aug. 31, 2016, the entire contents of which is incorporated herein for all purposes by this reference.

BACKGROUND

Field of the Invention

The present invention relates to a liquefied petroleum gas (LPG) a liquefied petroleum gas (LPG) filling system of a bi-fuel vehicle. More particularly, it relates to an LPG filling system of a bi-fuel vehicle that is configured for reducing the temperature and pressure in an LPG bombe for storing LPG in the case in which the external temperature is very high, e.g. in the hot season, wherein it is possible to refill the LPG bombe with LPG.

Description of Related Art

A bi-fuel vehicle using both gasoline and LPG is separately equipped with a gasoline supply system including a gasoline tank and a liquefied petroleum gas (LPG) a liquefied petroleum gas (LPG) supply system including an LPG bombe.

Figure 1:
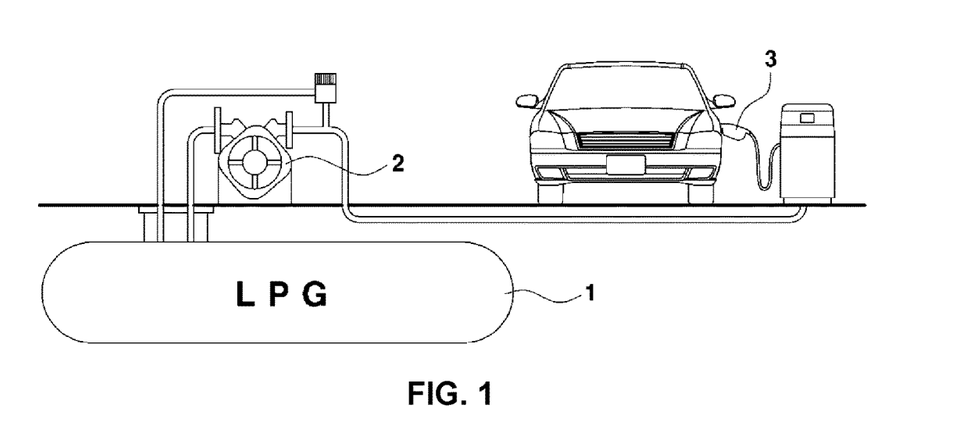
FIG. 1 is a view schematically showing an LPG filling process of a bi-fuel vehicle.

As shown in FIG. 1, a process of filling the LPG bombe of the bi-fuel vehicle with LPG includes a step of operating a filling pump 2 of an LPG filling station, a step of supplying LPG from an LPG storage space 1 of the LPG filling station to a filling gun 3 as the result of operating the filling pump 2, and a step of filling the LPG bombe of the vehicle with LPG through the filling gun 3.

However, in the case in which the external temperature is very high, e.g. in the hot season, the pressure in the LPG bombe of the vehicle may be higher than the LPG filling pressure, with the result that LPG filling is not possible.

That is, in the case in which the pressure in the LPG bombe of the vehicle is higher than the LPG filling pressure, a check valve of an excess flow valve mounted in an LPG injection port of the bombe is not opened, with the result that it is not possible to fill the LPG bombe with LPG through the filling gun.

For example, when the atmospheric temperature in the hot season is approximately 40° C. or higher, the pressure in the LPG bombe of the vehicle becomes higher (e.g. 16.5 bar) than the LPG filling pressure in the filling gun (e.g. 16.3 bar=the pressure in the LPG storage space of the LPG filling station 8.3 bar+the LPG pumping pressure as the result of operating the filling pump 8.0 bar). Consequently, the check valve of the excess flow valve mounted in the LPG injection port of the bombe is not opened, with the result that it is not possible to fill the LPG bombe with LPG through the filling gun.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an LPG filling system of a bi-fuel vehicle that is configured for cooling the inside of an LPG bombe and reducing the vapor pressure of LPG by supplying some gasoline from a gasoline tank into the LPG bombe using the fact that the temperature of gasoline in the gasoline tank is lower than the temperature of LPG in the LPG bombe, wherein it is possible to easily refill the LPG bombe with LPG even in the case in which the external temperature is very high, e.g. in the hot season.

In one aspect, various aspects of the present invention are directed to providing an LPG filling system of a bi-fuel vehicle including a gasoline pressurization line diverging from a gasoline supply line connected between a gasoline tank and an engine and connected to an LPG bombe, a solenoid valve mounted in the gasoline pressurization line, a controller configured for performing control such that the solenoid valve is configured to be opened or closed based on the pressure in the LPG bombe, and a nozzle mounted in the LPG bombe for spraying gasoline that has been supplied from the gasoline tank and passed through the gasoline pressurization line into the LPG bombe when the solenoid valve is opened.

In an exemplary embodiment, the nozzle may include a jet nozzle configured to vaporize gasoline when spraying gasoline.

In another exemplary embodiment, the gasoline pressurization line may be provided with a pressurization pump for pressurizing gasoline from the gasoline tank to the LPG bombe.

In still another exemplary embodiment, the gasoline pressurization line may be provided with a pressure sensor configured for detecting the pressure of gasoline supplied from the gasoline tank to the LPG bombe.

In yet another exemplary embodiment, the gasoline pressurization line may be provided at a point thereof between the solenoid valve and the nozzle with a flow meter for measuring the amount of gasoline supplied to the LPG bombe.

In still yet another exemplary embodiment, the LPG bombe may have therein a partition wall for partitioning the inside of the LPG bombe into a space in which the nozzle is positioned and a space in which an LPI pump is positioned and for preventing gasoline from being directly supplied to the LPI pump.

In a further exemplary embodiment, the controller may control the amount of time for which the solenoid valve is open based on a remaining LPG amount measurement signal from an LPG gauge mounted in the LPG bombe and a gasoline supply amount measurement signal from a flow meter mounted in the gasoline pressurization line to determine the amount of gasoline to be supplied to the LPG bombe.

In another further exemplary embodiment, the pressure in the LPG bombe may be measured using a pressure sensor in a regulator mounted in an LPG supply line and an LPG return line.

In another aspect, various aspects of the present invention are directed to providing an LPG filling system of a bi-fuel vehicle including a gasoline pressurization line diverging from a gasoline supply line connected between a gasoline tank and an engine and connected to an LPG bombe, a check valve mounted in the gasoline pressurization line, and a nozzle mounted in the LPG bombe for spraying gasoline that has been supplied from the gasoline tank and passed through the gasoline pressurization line into the LPG bombe when the check valve is opened.

In an exemplary embodiment, the operation pressure for opening the check valve may be set to be lower than the sum of the gasoline discharge pressure attributable to the operation of an gasoline pump and the gasoline pressurization pressure attributable to the operation of a pressurization pump and to be higher than the gasoline discharge pressure caused by the operation of only the gasoline pump or the pressurization pump.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As previously described, a bi-fuel vehicle is separately equipped with a gasoline supply system including a gasoline tank and a liquefied petroleum gas (LPG) a liquefied petroleum gas (LPG) supply system including an LPG bombe.

Figure 2:
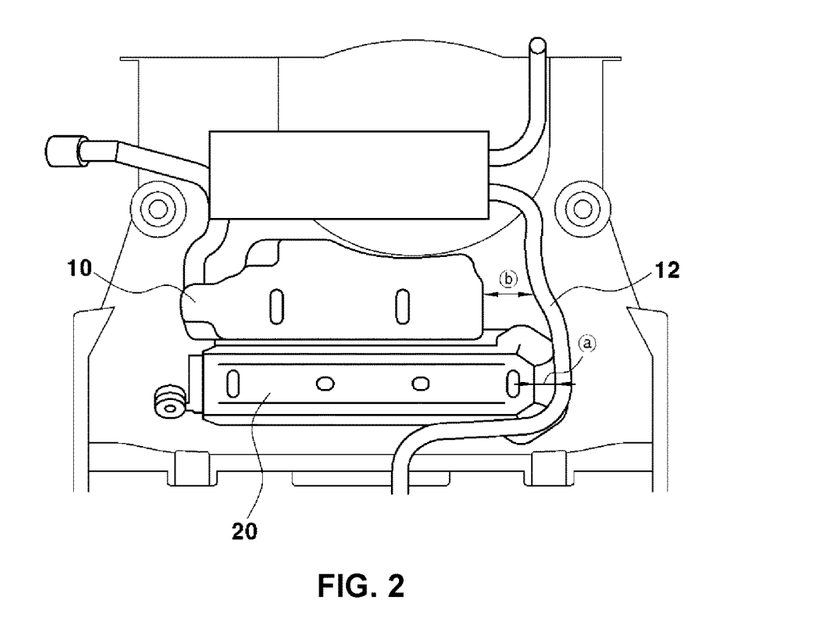
FIG. 2 is a view schematically showing the state in which a gasoline tank and an LPG bombe are positioned in a bi-fuel vehicle.

As shown in FIG. 2, a gasoline tank 10 and an LPG bombe 20 are separately mounted to the chassis of the bi-fuel vehicle. Depending on the layout of the bi-fuel vehicle, the distance ⓐ between the LPG bombe 20 and an exhaust gas discharge line 12 is shorter than the distance ⓑ between the gasoline tank 10 and the exhaust gas discharge line 12. As a result, the gasoline tank 10 is less affected by a heat source than the LPG bombe 20.

Consequently, the temperature of gasoline in the gasoline tank 10 is maintained lower than the temperature of LPG in the LPG bombe 20.

In addition, the gasoline supplied from the gasoline tank to an engine is burned without returning to the gasoline tank, whereas the unburned portion of the LPG supplied from the LPG bombe to the engine is returned to the LPG bombe.

Since the LPG is returned from the engine to the LPG bombe in the state in which the temperature of the LPG is increased by the heat of combustion in the engine, the temperature in the LPG bombe is increased.

As a result, the temperature in the LPG bombe becomes higher than the temperature in the gasoline tank. Furthermore, in the case in which the external temperature is very high, e.g. in the hot season, the temperature in the LPG bombe is further increased and, at the same time, the pressure in the LPG bombe is also increased. When the pressure in the LPG bombe becomes higher than the LPG filling pressure, however, LPG filling is not possible.

To solve this problem, the present invention is characterized in that, in consideration of the fact that the temperature of gasoline in the gasoline tank is lower than the temperature of LPG in the LPG bombe, some of the gasoline in the gasoline tank is supplied into the LPG bombe to cool the interior of the LPG bombe and to reduce the vapor pressure of LPG using the supplied gasoline, thereby smoothly achieving refilling of the LPG bombe with LPG.

Here, the construction of an LPG filling system of a bi-fuel vehicle according to various exemplary embodiments of the present invention will be described.

Figure 3:
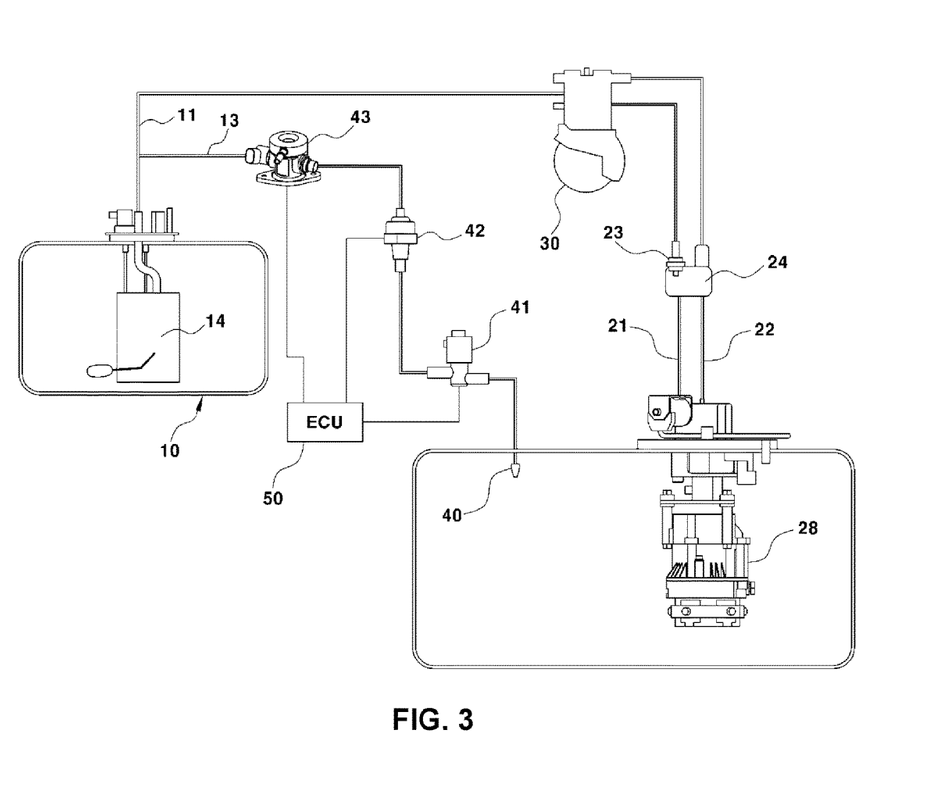
FIG. 3 is a view showing the construction of an LPG filling system of a bi-fuel vehicle according to various exemplary embodiments of the present invention.

FIG. 3 is a view showing the construction of an LPG filling system of a bi-fuel vehicle according to various exemplary embodiments of the present invention. In FIG. 3, reference numeral 10 indicates a gasoline tank for storing gasoline, and reference numeral 20 indicates an LPG bombe for storing LPG.

The gasoline tank 10 and the LPG bombe 20 are connected to a single engine 30 to supply gasoline and LPG to the engine 30, respectively.

Specifically, the gasoline tank 10 is connected to the engine 30 via a gasoline supply line 11, and the LPG bombe 20 is connected to the engine 30 via an LPG supply line 21.

The LPG bombe 20 is also connected to the engine 30 via an LPG return line 22. A regulator 24 having a pressure sensor 23 is mounted in the LPG supply line 21 and the LPG return line 22.

When LPG from the LPG bombe 20 is supplied to the engine 30 via the LPG supply line 21, and unburned LPG is returned to the LPG bombe 20 via the LPG return line 22, the regulator 24 controls the flow of LPG and detects the pressure of LPG.

Specifically, when LPG from the LPG bombe 20 is supplied to the engine 30 via the LPG supply line 21, the pressure sensor 23, which is included in the regulator 24, detects the pressure of LPG passing through the regulator 24, and the detected pressure is transmitted to a controller (ECU) 50 as a signal indicating the pressure in the LPG bombe 20.

According to an exemplary embodiment of the present invention, the LPG bombe 20 is provided with a nozzle 40 for spraying gasoline from the gasoline tank 10 into the LPG bombe. Gasoline sprayed through the nozzle 40 exchanges heat with the inner space of the LPG bombe and LPG in the LPG bombe to cool the LPG bombe and LPG in the LPG bombe.

A gasoline pressurization line 13, which diverges from the gasoline supply line 11, is connected to the nozzle 40.

That is, the gasoline pressurization line 13, which diverges from the gasoline supply line 11 connected between the gasoline tank 10 and the engine 30, is communicably connected to the nozzle 40, which is mounted at the LPG bombe 20.

A jet nozzle, which is a kind of jet pump, configured for spraying a fixed amount of gasoline from the gasoline pressurization line 13 into the LPG bombe 20 may be used as the nozzle 40.

The jet nozzle is used as the nozzle 40 such that, when a high-pressure fluid (i.e. gasoline) is sprayed into a low-pressure expansion space (i.e. the LPG bombe), particles of the fluid are pulverized to thus induce heat of vaporization (i.e. an endothermic reaction).

Meanwhile, the gasoline pressurization line 13, which is connected between the gasoline tank 10 and the nozzle 40, is provided with a pressurization pump 43, a pressure sensor 42, and a solenoid valve 41, which are sequentially arranged from the gasoline tank.

When the pressure in the LPG bombe reaches an upper reference value (e.g. 11 bar), the pressurization pump 43 is driven to pressurize gasoline from the gasoline tank 10 at a pressure higher than the pressure in the LPG bombe such that gasoline easily moves into the LPG bombe 20 through the nozzle 40.

The pressure sensor 42 is used to check whether the pressurization pump 43 operates normally. The pressure sensor 42 detects the supply pressure of gasoline flowing from the gasoline tank 10 to the nozzle 40 via the pressurization pump 43, and transmits the detected pressure to the controller 50.

When the supply pressure of gasoline detected by the pressure sensor 42 is lower than a reference value (e.g. 12 bar), the controller 50 performs control such that the solenoid valve 41 is closed. The reason for this is that, when the supply pressure of gasoline is lower than the reference value (e.g. 12 bar), LPG from the LPG bombe 20 may flow backward toward the gasoline tank 10 through the solenoid valve 41, which is in an open state.

The solenoid valve 41 is opened or closed in response to a control signal from the controller 50 to allow or interrupt the flow of gasoline from the gasoline tank 10 to the nozzle 40.

Figure 4:
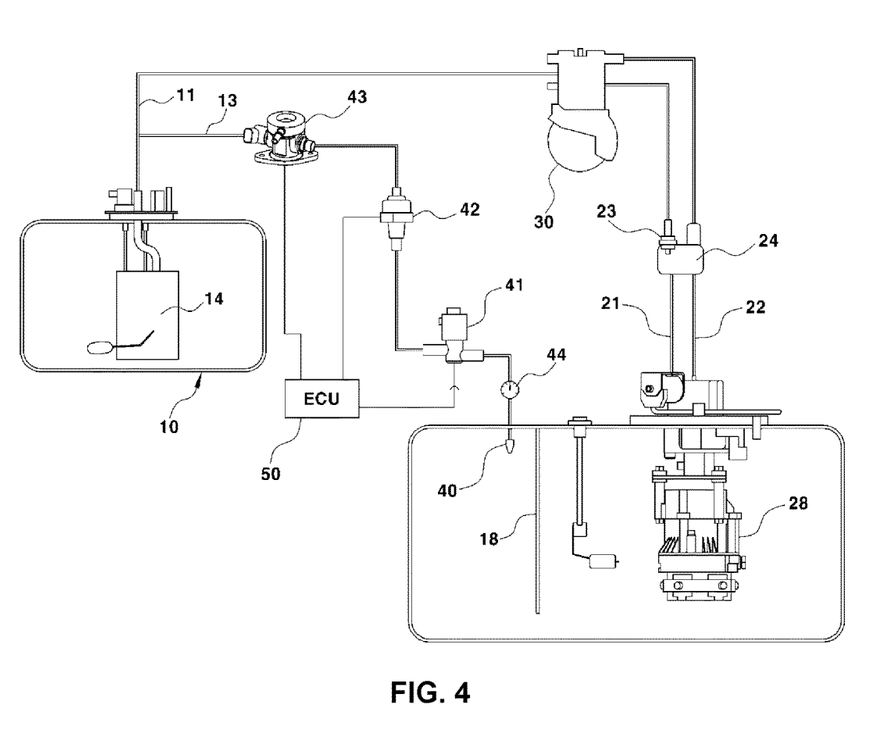
FIG. 4 is a view showing a flow meter and an LPG gauge further mounted in the LPG filling system of the bi-fuel vehicle according to the various exemplary embodiments of the present invention and a partition wall mounted in an LPG bombe.

As shown in FIG. 4, a flow meter 44 for measuring the amount of gasoline that is supplied to the LPG bombe 20 and transmitting the measurement result to the controller 50 is further mounted in the gasoline pressurization line 13 at a point of thereof adjacent to the nozzle 40.

An LPG gauge 45 for measuring the residual amount of LPG in the LPG bombe 20 is mounted in the LPG bombe 20. The residual amount of LPG measured by the LPG gauge 45 is transmitted to the controller 50 as a signal indicating the residual amount of LPG.

Upon determining that the pressure in the LPG bombe 20, which is received from the pressure sensor 23, is equal to or higher than a reference pressure, the controller 50 performs control such that the solenoid valve 41 is opened. In addition, the controller 50 controls time for which the solenoid valve 41 is open based on the residual amount of LPG in the LPG bombe 20, which is received from the LPG gauge 45.

Gasoline from the gasoline tank 10 passes through the solenoid valve 41, is sprayed into the LPG bombe 20 through the nozzle 40, and exchanges heat with the inner space of the LPG bombe and LPG in the LPG bombe. Consequently, the inside of the LPG bombe is cooled. As a result, the temperature in the LPG bombe is lowered, and the vapor pressure of LPG is also lowered.

The pressure in the LPG bombe 20 becomes lower than the upper reference value as a result of the inside of the LPG bombe 20 being cooled and the vapor pressure of LPG being lowered. Consequently, it is possible to easily refill the LPG bombe 20 with LPG.

When gasoline is mixed with LPG, gasoline reduces the vapor pressure of LPG, since the temperature of gasoline is lower than the temperature of LPG.

Gasoline and LPG are compounds including C and H (gasoline and LPG are different from each other only in terms of the number of C and H atoms). When the gasoline is mixed with LPG, therefore, the mixture is burned without problems. To comply with relevant regulations, however, the controller 50 may control the amount of time for which the solenoid value is open such that the amount of gasoline supplied into the LPG bombe is less than 10% of the amount of LPG.

As shown in FIG. 4, a partition wall 18 is mounted in the LPG bombe 20 to partition the inside of the LPG bombe 20 into a space in which an auxiliary chamber is positioned and a space in which an LPI pump 28 is positioned. The partition wall 18 prevents gasoline from being directly supplied to the LPI pump.

Hereinafter, the operation of the LPG filling system of the bi-fuel vehicle according to the various exemplary embodiments of the present invention with the above-stated construction will be described.

Figure 5:
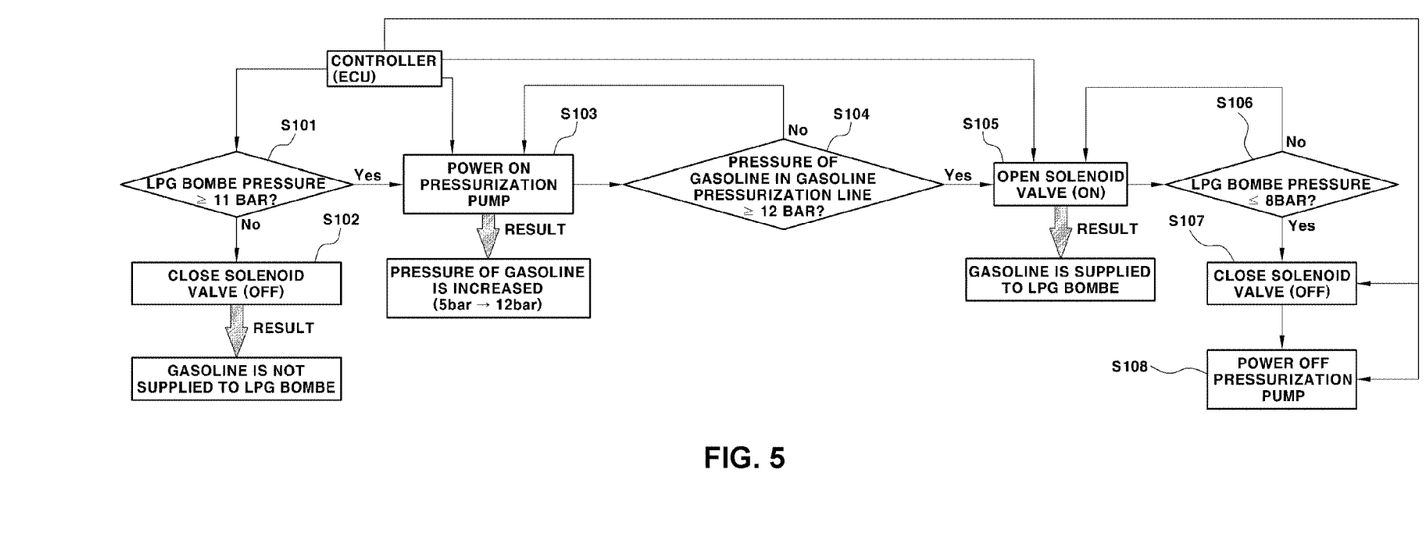
FIG. 5 is a flowchart performed by a controller and showing the operation of the LPG filling system of the bi-fuel vehicle according to the various exemplary embodiments of the present invention.
Figure 6:
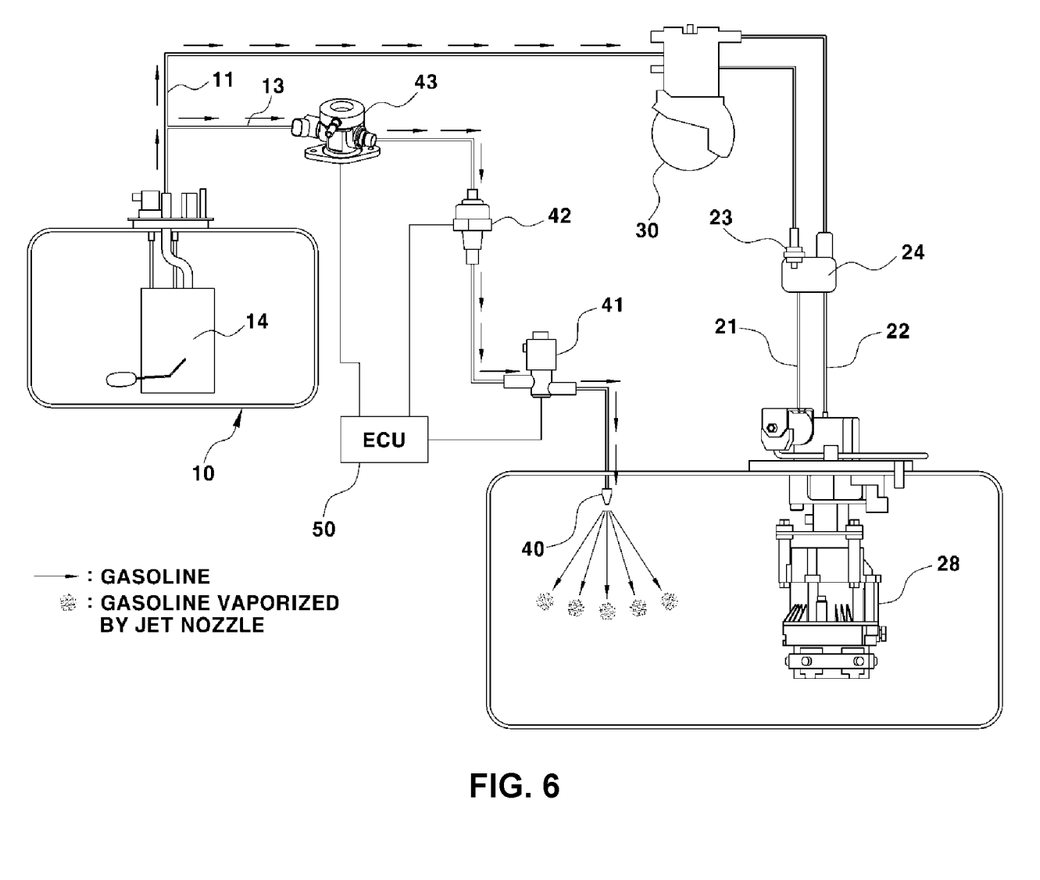
FIG. 6 is a view showing the operation of the LPG filling system of the bi-fuel vehicle according to various exemplary embodiments of the present invention.

FIG. 5 is a flowchart performed by a controller and showing the operation of the LPG filling system of the bi-fuel vehicle according to the various exemplary embodiments of the present invention, and FIG. 6 is a view showing the operation of an LPG bombe cooling system according to various exemplary embodiments of the present invention.

First, the pressure in the LPG bombe 20 is sensed.

Specifically, the pressure in the LPG bombe 20 is detected using the pressure sensor 23, and the detected pressure is transmitted to the controller 50 as a signal.

Subsequently, the controller compares the pressure in the LPG bombe 20 with the upper reference value (e.g. 11 bar) (S101).

When the pressure in the LPG bombe 20 is lower than the upper reference value (e.g. 11 bar), the controller 50 performs control such that the solenoid valve 41 is configured to be closed (S102).

As a result of the solenoid valve 41 being closed, gasoline from the gasoline tank 10 is supplied only to the engine. That is, gasoline from the gasoline tank 10 is not supplied to the LPG bombe 20.

When the pressure in the LPG bombe 20 is higher than the upper reference value (e.g. 11 bar), the controller 50 performs control such that the pressurization pump 43 is powered on and thus driven (S103).

As a result, the pressure of gasoline flowing from the engine to the gasoline pressurization line 13 is increased (e.g. from 5 bar to 12 bar).

At this time, the pressure sensor 42, mounted in the gasoline pressurization line 13, detects the pressure of gasoline, and transmits the detected gasoline pressure to the controller 50.

Subsequently, the controller compares the gasoline pressure, specifically the pressure of gasoline in the gasoline pressurization line 13, with the reference value (e.g. 12 bar), which is higher than the pressure in the LPG bombe (S104). When the pressure of gasoline is higher than the reference value, the controller 50 performs control such that the solenoid valve 41 is configured to be opened (S105).

As a result, as shown in FIG. 6, gasoline from the gasoline tank 10 is supplied to the engine as the result of the operation of a gasoline pump 14. At the same time, some gasoline is supplied to the nozzle 40 via the solenoid valve 41 as the result of the operation of the pressurization pump 43, and is sprayed into the LPG bombe 20 through the nozzle 40.

When gasoline is sprayed into the LPG bombe through the nozzle 40, which may be a jet nozzle, some gasoline is pulverized to induce heat of vaporization (i.e. an endothermic reaction). In addition, gasoline exchanges heat with the inner space of the LPG bombe and LPG in the LPG bombe. Consequently, the inside of the LPG bombe is cooled. As a result, the temperature in the LPG bombe and the temperature of LPG in the LPG bombe are lowered. In addition, the vapor pressure of LPG is also lowered.

At this time, the vapor pressure of LPG (e.g. 0.44 to 0.82 bar) due to heat of vaporization is very slight, compared to the pressure in the LPG bombe (e.g. 11 bar). when gasoline is vaporized, therefore, the increase of the pressure in the LPG bombe due to gasoline is very slight. Rather, the temperature in the LPG bombe is lowered due to the vaporization of gasoline.

The controller 50 is configured to determine whether the pressure in the LPG bombe 20 has been reduced to less than the reference pressure (e.g. 8 bar) as the result of the inside of the LPG bombe 20 being cooled and the vapor pressure of LPG being lowered (S106). When the pressure in the LPG bombe 20 has been reduced to less than the reference pressure (e.g. 8 bar), which means that it is possible to refill the LPG bombe with LPG, the controller 50 performs control such that the solenoid valve 41 and the pressurization pump 43 are turned off (S107 and S108).

Meanwhile, the controller 50 checks the residual amount of LPG in the LPG bombe based on the signal from the LPG gauge 45 and, at the same time, checks the signal indicating the amount of gasoline supplied to the LPG bombe from the flow meter 44 to control the amount of time for which the solenoid valve 41 is open.

The controller 50 may control the amount of time for which the solenoid valve 41 is open such that the amount of gasoline supplied into the LPG bombe is less than 10% of the amount of LPG.

Meanwhile, the travel mode of the bi-fuel vehicle, to which the LPG filling system according to an exemplary embodiment of the present invention is applied, is classified into a gasoline mode using gasoline and an LPG mode using LPG. Even in the LPG mode, however, the gasoline mode is executed until the pressure in the LPG bombe is lowered to less than the reference pressure (e.g. approximately 8 bar).

As described above, in the case in which the external temperature is very high, e.g. in the hot season, the inside of the LPG bombe is cooled and the vapor pressure of LPG is lowered using gasoline, the temperature of which is lower than that of LPG. Consequently, it is possible to reduce the pressure in the LPG bombe. As a result, it is possible to refill the LPG bombe with LPG.

Hereinafter, the construction and operation of an LPG filling system of a bi-fuel vehicle according to various exemplary embodiments of the present invention will be described.

Figure 7:
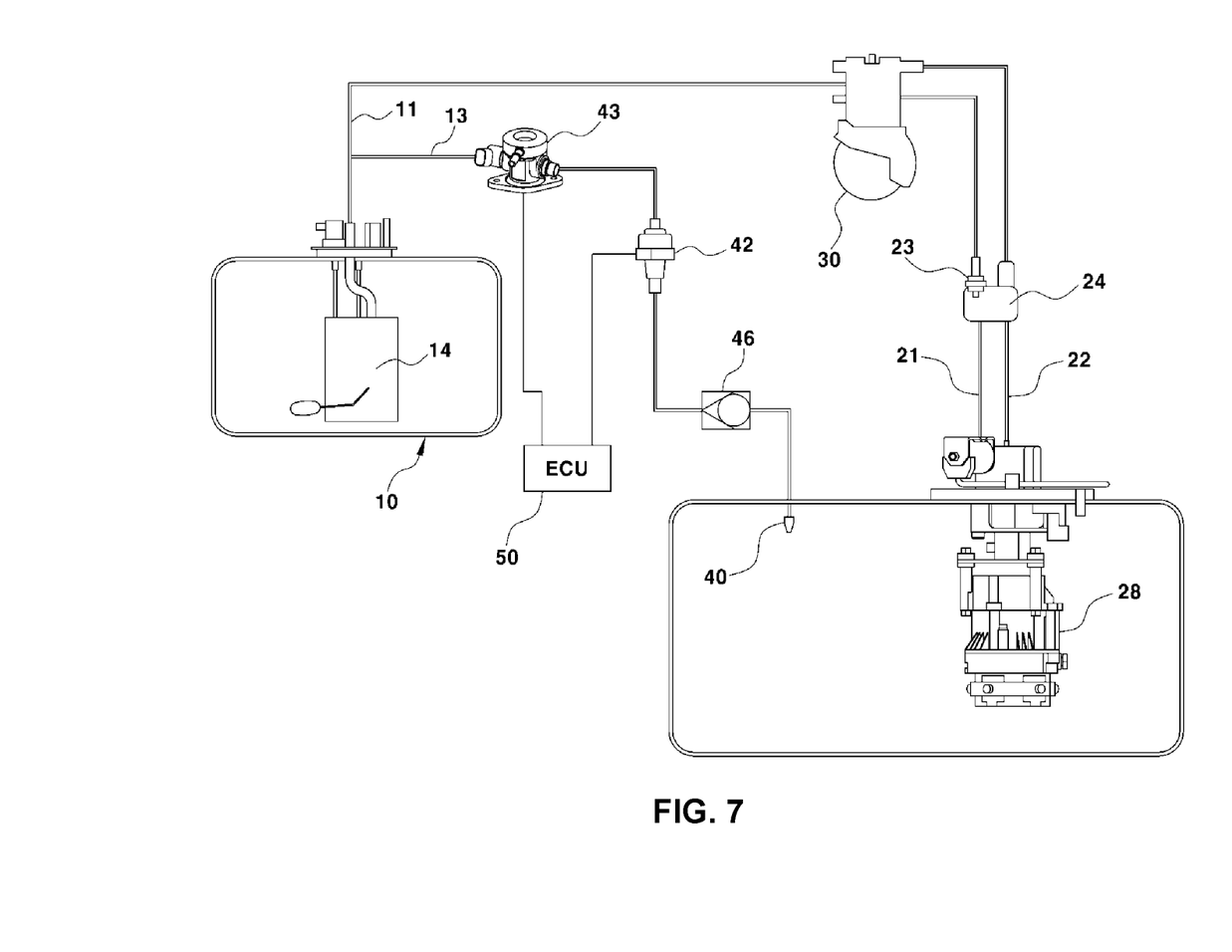
FIG. 7 is a view showing the construction of an LPG filling system of a bi-fuel vehicle according to various exemplary embodiments of the present invention.

FIG. 7 is a view showing the construction of an LPG filling system of a bi-fuel vehicle according to various exemplary embodiments of the present invention. In FIG. 7, reference numeral 46 indicates a check valve.

The construction and operation of the LPG filling system according to the various exemplary embodiments of the present invention are identical to those of the LPG filling system according to the various exemplary embodiments of the present invention except that a one-way check valve 46 is used in place of the solenoid valve 41 in the various exemplary embodiments.

The opening or closing of the solenoid valve 41 is controlled by the controller 50. In this embodiment, however, the check valve 46 supplies some gasoline from the gasoline tank into the LPG bombe without being controlled by the controller.

In order for the check valve 46 to supply some gasoline from the gasoline tank into the LPG bombe, the specification and opening operation pressure of the check valve must be considered.

To this end, the operation pressure of the check valve 46, i.e. the pressure that may be applied to the check valve to open the check valve, is set to be lower than the sum of gasoline discharge pressure attributable to the operation of the gasoline pump 14 and gasoline pressurization pressure attributable to the operation of the pressurization pump 43 and to be higher than gasoline discharge pressure attributable to the operation of only the gasoline pump 14 or the pressurization pump 43.

More specifically, the check valve 46 may be configured to be opened when the sum of gasoline discharge pressure attributable to the operation of the gasoline pump 14 in the gasoline tank and gasoline pressurization pressure attributable to the operation of the pressurization pump 43 is applied to the check valve 46 and so as not to be opened when gasoline discharge pressure attributable to the operation of only the gasoline pump 14 or the pressurization pump 43 is applied to the check valve 46.

According to the various exemplary embodiments of the present invention, even in the case in which the check valve is used in place of the solenoid valve, it is possible to easily supply some gasoline from the gasoline tank into the LPG bombe using the fact that the temperature of gasoline in the gasoline tank is lower than the temperature of LPG in the LPG bombe. Consequently, it is possible to cool the inside of the LPG bombe and, at the same time, to lower the pressure in the LPG bombe. As a result, it is possible to easily refill the LPG bombe with LPG.

The construction and operation of the LPG filling system according to the various exemplary embodiments of the present invention are identical to those of the LPG filling system according to the various exemplary embodiments of the present invention except that the check valve is used in place of the solenoid valve, and therefore a detailed description thereof will be omitted.

As is apparent from the above description, the present invention has the following effects.

According to an exemplary embodiment of the present invention, in the case in which the external temperature is very high, e.g. in the hot season, the inside of the LPG bombe is cooled and the vapor pressure of LPG is lowered using gasoline, the temperature of which is lower than that of LPG. Consequently, it is possible to reduce the pressure in the LPG bombe, making it possible to easily refill the LPG bombe with LPG.

That is, it is possible to cool the inside of the LPG bombe and, at the same time, to lower the pressure in the LPG bombe by supplying some gasoline from the gasoline tank into the LPG bombe using the fact that the temperature of gasoline in the gasoline tank is lower than the temperature of LPG in the LPG bombe. As a result, it is possible to easily refill the LPG bombe with LPG.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A liquefied petroleum gas (LPG) filling system of a bi-fuel vehicle comprising:
   a gasoline pressurization line diverging from a gasoline supply line connected between a gasoline tank and an engine and connected to an LPG bombe;
   a solenoid valve mounted in the gasoline pressurization line;
   a controller configured for performing control, wherein the solenoid valve is configured to be opened or closed based on a pressure in the LPG bombe; and
   a nozzle mounted in the LPG bombe for spraying gasoline that passes through the gasoline pressurization line and is supplied from the gasoline tank into the LPG bombe when the solenoid valve is opened.

2. The LPG filling system of claim 1, wherein the nozzle includes a jet nozzle configured to vaporize gasoline when spraying gasoline.

3. The LPG filling system of claim 1, wherein the gasoline pressurization line is provided with a pressurization pump for pressurizing gasoline from the gasoline tank to the LPG bombe.

4. The LPG filling system of claim 1, wherein the gasoline pressurization line is provided with a pressure sensor configured for detecting a pressure of gasoline supplied from the gasoline tank to the LPG bombe.

5. The LPG filling system of claim 1, wherein the gasoline pressurization line is provided at a point thereof between the solenoid valve and the nozzle with a flow meter for measuring an amount of gasoline supplied to the LPG bombe.

6. The LPG filling system of claim 1, wherein the LPG bombe has therein a partition wall for partitioning an inside of the LPG bombe into a space in which the nozzle is positioned and a space in which an LPI pump is positioned and for preventing gasoline from being directly supplied to the LPI pump.

7. The LPG filling system of claim 1, wherein the controller is configured to control an amount of time for which the solenoid valve is open based on a remaining LPG amount measurement signal from an LPG gauge mounted in the LPG bombe and a gasoline supply amount measurement signal from a flow meter mounted in the gasoline pressurization line to determine an amount of gasoline that is supplied to the LPG bombe.

8. The LPG filling system of claim 1, wherein the pressure in the LPG bombe is measured using a pressure sensor in a regulator mounted in an LPG supply line and an LPG return line.

9. A liquefied petroleum gas (LPG) filling system of a bi-fuel vehicle comprising:
   a gasoline pressurization line diverging from a gasoline supply line connected between a gasoline tank and an engine and connected to an LPG bombe;
   a check valve mounted in the gasoline pressurization line; and
   a nozzle mounted in the LPG bombe for spraying gasoline that passes through the gasoline pressurization line and is supplied from the gasoline tank into the LPG bombe when the check valve is opened.

10. The LPG filling system of claim 9, wherein the nozzle includes a jet nozzle configured to vaporize gasoline when spraying gasoline.

11. The LPG filling system of claim 9, wherein the gasoline pressurization line is provided with a pressurization pump for pressurizing gasoline from the gasoline tank to the LPG bombe.

12. The LPG filling system of claim 9, wherein an operation pressure for opening the check valve is set to be lower than a sum of a gasoline discharge pressure due to an operation of an gasoline pump and a gasoline pressurization pressure due to an operation of a pressurization pump and to be higher than the gasoline discharge pressure due to an operation of one selected from the gasoline pump and the pressurization pump.

* * * * *